Figure 1:
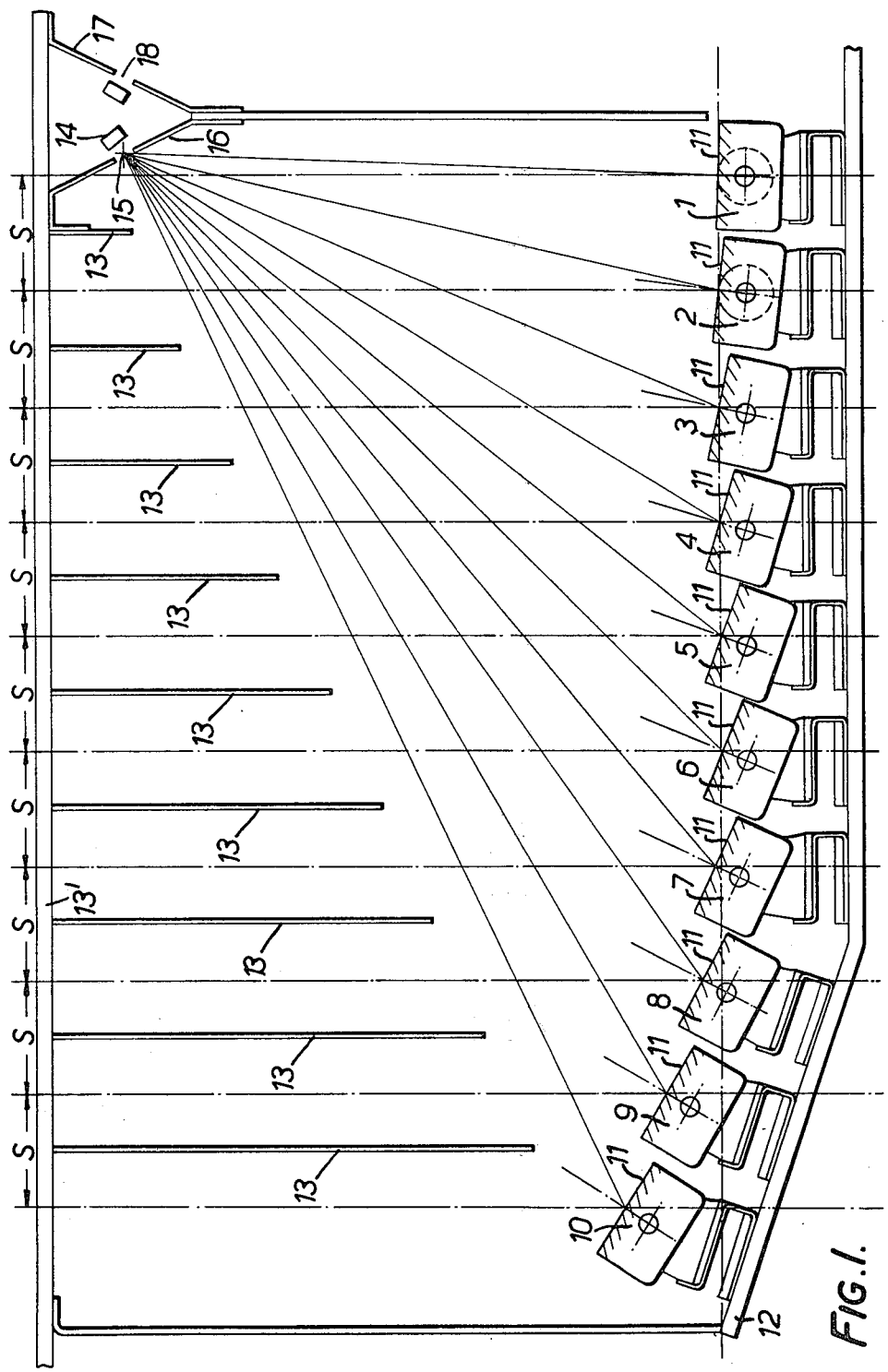

United States Patent [19]
Baxter

[11] 3,900,262
[45] Aug. 19, 1975

[54] OPTICAL VELOCITY MEASURING APPARATUS

[75] Inventor: Ivor Renton Baxter, Brentwood, England

[73] Assignee: The Marconi Company Limited, Chelmsford, England

[22] Filed: Oct. 25, 1972

[21] Appl. No.: 300,814

[52] U.S. Cl. ............. 356/28; 250/237 G; 350/292; 350/299
[51] Int. Cl.² ........................................ G01P 3/36
[58] Field of Search ............. 350/299, 292, 162 ZP; 356/28, 167, 169, 170, 158, 159, 160; 250/237 G, 219 D, 237 R

[56] References Cited
UNITED STATES PATENTS

| | | | |
|---|---|---|---|
| 2,136,486 | 11/1938 | Blondin | 350/292 |
| 2,945,417 | 7/1960 | Caryl et al. | 350/292 |
| 3,059,521 | 10/1962 | Clemens et al. | 356/28 |
| 3,519,351 | 7/1970 | Lerwill | 356/28 |
| 3,778,158 | 12/1973 | Erickson | 356/28 |

Primary Examiner—Maynard R. Wilbur
Assistant Examiner—S. C. Buczinski
Attorney, Agent, or Firm—Baldwin, Wight & Brown

[57] ABSTRACT

Optical velocity measuring apparatus in which a set of elemental reflecting elements view a different spaced portion of the line of travel of an object each element directing light from its respective portion onto a common photo-sensitive device to provide an electrical output which includes a spectral component of modulation dependent on the velocity of an object travelling along the line.

7 Claims, 4 Drawing Figures

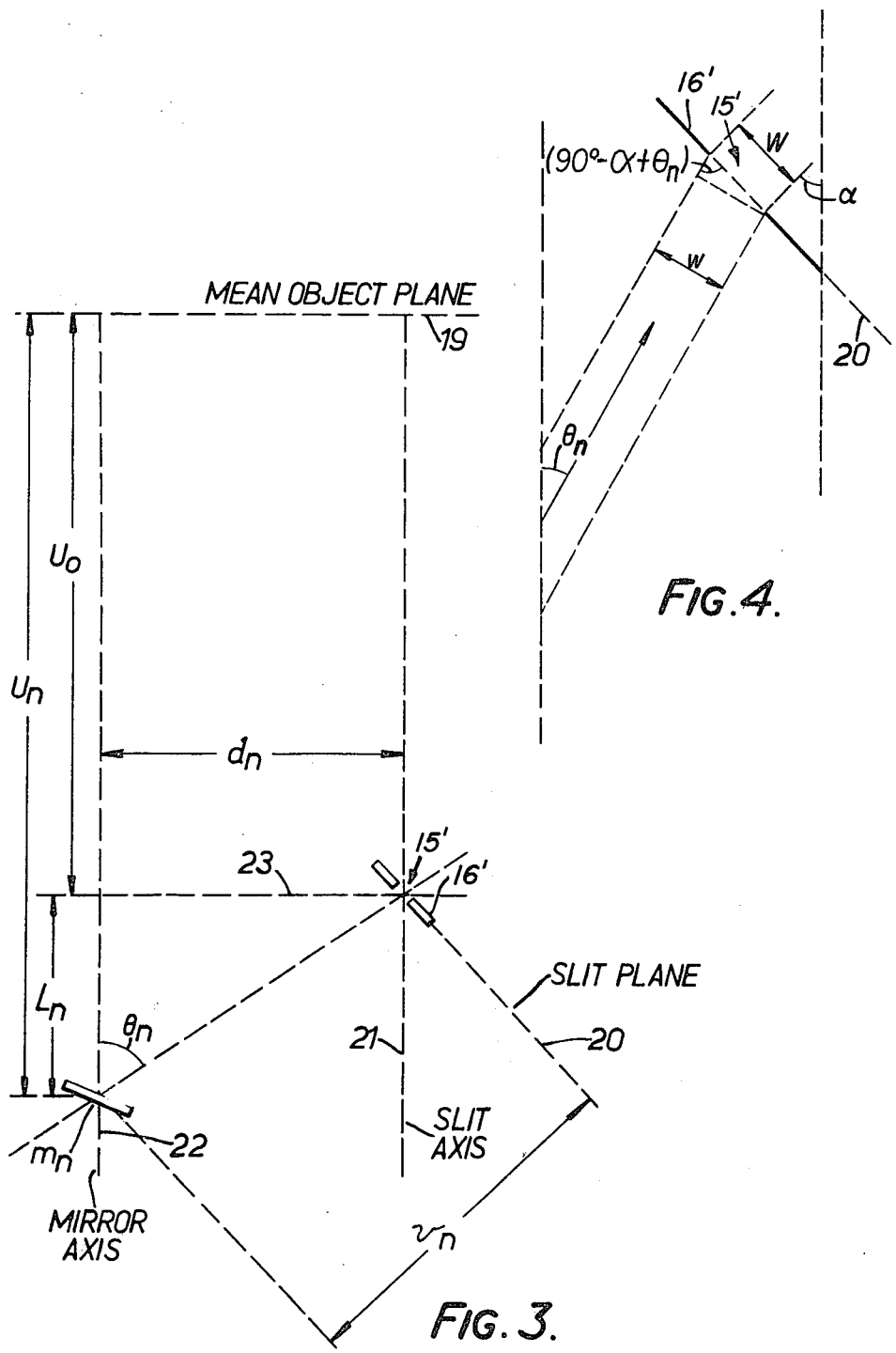

OPTICAL VELOCITY MEASURING APPARATUS

This invention relates to optical velocity measuring apparatus and more particularly to such apparatus in which a velocity dependent spectral component of modulation is derived from a photo-sensitive device receiving spatial reflections of light derived when a moving surface passes an optical grating between it and the photo-sensitive device.

The invention seeks to provide improved such apparatus of satisfactory overall line of movement aperture and satisfactory light gathering aperture.

According to this invention an optical velocity measuring apparatus comprises a set of elemental reflecting elements each arranged to view a different spaced portion of the line of travel of an object so as to provide an effective optical grating in space along said line and each arranged to direct light from its respective portion onto a common photo-sensitive device, the whole arrangement being such that in operation the electrical output of said device includes a spectral component of modulation which is dependent upon velocity of an object travelling along said line.

Normally said photo-sensitive device is arranged to receive light from said elemental reflecting elements through an aperture and said individual reflecting elements are each part cylindrical mirrors, the whole arrangement being such that for each reflective element $$w = \frac{v}{u} \times s$$

where $w$ is the width of said aperture as seen by the element $u$ is the object distance from said element to its respective portion of said line of travel and chosen arbitrarily with a mean range in view $v$ is the image distance of said reflective element and $s$ is the spatial frequency of said grating in space.

The individual reflective elements may be aligned on a common plane perpendicular to the planes of incident light on the elements. However, in one embodiment of the invention each element is inclined at an angle to the plane of incident light which is greater than that of an adjacent element and some elements depart from a common plane perpendicular to the planes of incident light to an increasing extent so as to provide optimum reflective light to said photo-sensitive device.

In another embodiment of the invention a set of reflective elements are arranged on a curve such that for each element the relationship between the image distance between each individual element and the aperture on the one hand and the projected slit width at the mirror on the other hand is at least substantially the same for each element in the set.

Two sets of reflective elements may be provided each forming one half portion of a dish and each directing light to a common photo-sensitive device individual to that set.

In each case the photo-sensitive device may comprise two photo-electric detectors mounted side by side to view adjacent portions of each grating line in space, the outputs of the two detectors being relatively inverted and combined in such manner that spurious responses tend to cancel.

Figure 2:
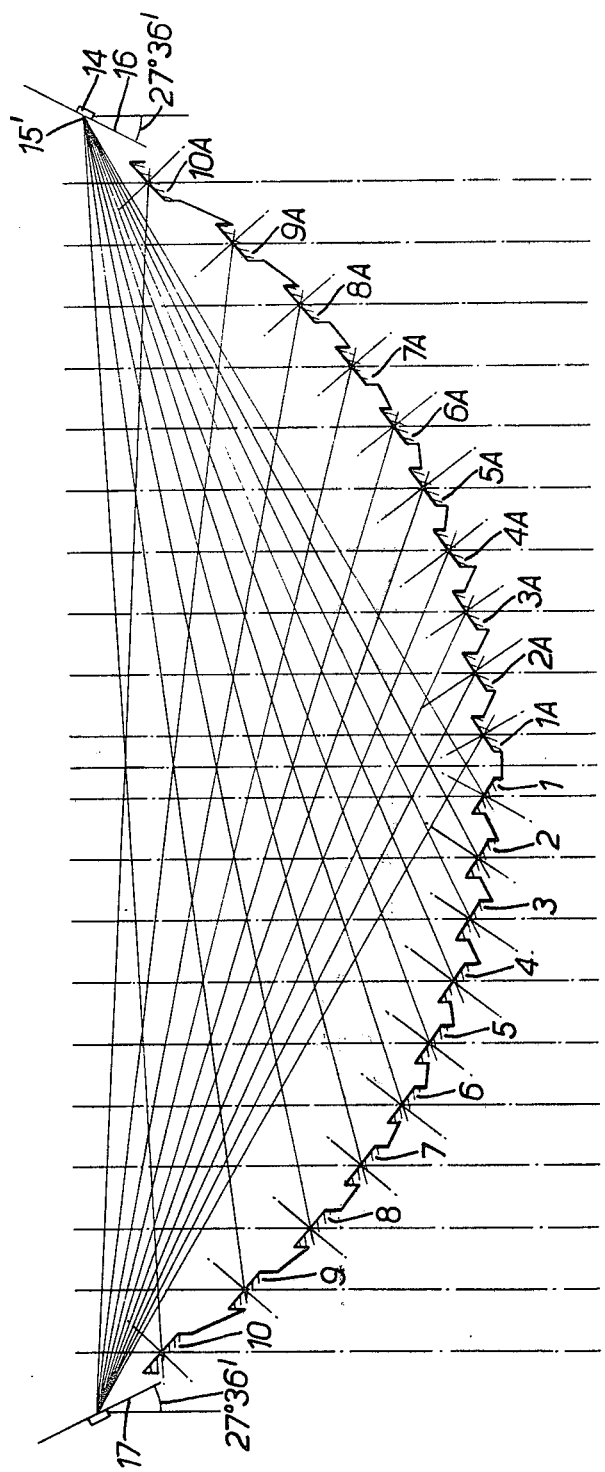

The invention is illustrated in and further described with reference to the accompanying drawings in which, FIG. 1 represents in plan, one embodiment of optical velocity measuring apparatus in accordance with the present invention, FIG. 2 illustrates a further embodiment of optical velocity measuring apparatus in accordance with the present invention and FIGS. 3 and 4 are explanatory diagrams illustrating the considerations to be taken into account in positioning each of the elemental mirrors of the arrangement of FIG. 2.

Referring to FIG. 1, a plurality, in this case ten, part cylindrical mirrors 1, 2, 3, 4, 5, 6, 7, 8, 9, 10, each consisting of a block of material such as that known under the registered Trade Mark Araldite with a deposited reflective layer of aluminium 11 on one surface, are arranged to view different spaced portions of a line of travel in space of a moving object so as to provide an effective optical grating in space. The mirrors 1 to 10 are arranged in a housing 12 having a window area 13' through which the mirrors 1 to 10 view said line of travel. As a precaution against spurious reflections the paths of light from the respective portions of said line of travel to each mirror 1 to 10 are separated by baffle members 13. Each mirror 1 to 10 is arranged to focus light received from its respective portion of said line of travel on to a common photo-sensitive arrangement 14 through a slit aperture 15 in a screen 16. As will be seen the baffle members 13 are progressively shorter, travelling from left to right as viewed in order to avoid interrupting the path of light from the mirrors 2 to 10 to the slit 15.

The curvature of each of the mirrors 1 to 10, their dispositions relative to the photo-sensitive arrangement 14 and the effective width of the aperture 15 in screen 16, as seen by each individual mirror, are such that:-

$$w = \frac{v}{u} \times s$$

where $w$ is the width of said aperture as seen by the element $u$ is the object distance from said element to its respective portion of said line of travel, chosen arbitrarily with a mean range in view $v$ is the image distance of said reflective element and $s$ is the spatial frequency of said grating in space.

It will be noted that the individual mirrors 1 to 10 are inclined to the parallel planes of incident light at angles which increase, from right to left as viewed with respect to one another that the mirrors 1–6 are aligned along a common plane perpendicular to said planes of incident light; and that the mirrors 7–10 depart from such a common plane so as to provide optimum light received from each mirror by the photo-sensitive arrangement 14. In a practical case, with a disposition of the elemental mirrors relative to the photo-sensitive arrangement 14 as illustrated the radius of curvature of each of the mirrors 1 to 10 were as follows:

| 1. | 8.21" | 2. | 8.45" |
| 3. | 9.05" | 4. | 9.90" |
| 5. | 10.96" | 6. | 12.20" |
| 7. | 13.47" | 8. | 14.89" |
| 9. | 16.46" | 10. | 18.12" |

The electrical output from the photo-sensitive arrangement 14 will in operation contain a spectral component of light modulation which is dependent upon the velocity of the surface of the body passing through said grating in space and may be processed in known manner.

Whilst the photo-sensitive arrangement 14 may include a single photo-electric detector, if desired two photo-electric detectors may be arranged side by side to view adjacent portions of each grating line in space, the outputs of the two detectors being relatively inverted and combined in such manner that spurious responses tend to cancel.

The arrangement so far described may itself form a complete optical viewing head, but normally the system shown in the drawing would be repeated as a mirror image to the right (as viewed) of the drawing. In fact in FIG. 1 the apertured screen 17 and the photo-sensitive arrangement 18 of such a mirror image second half are shown. Conveniently the mirrors apertured screens and photo-sensitive devices are mounted in a single evacuated unit somewhat similar in nature to the automobile sealed beam head lamp units currently in general use. As will be appreciated, the system described above is one collimated in space such as to provide a sensibly constant effective grating spacing such as to render the system substantially insensitive to range.

Referring to FIG. 2, in which like references are used to denote like parts in FIG. 1, there are again ten mirrors, 1 to 10, arranged to view different portions of the line of travel in space of a moving object. In the case of FIG. 2, the system consisting of the mirrors 1 to 10 and their mirror images 1a to 10a as shown in full. The housing 12 with its window 13' and baffle member 13 are not represented in FIG. 2.

In FIG. 2, the apertured screens 16 and 17 and photo-sensitive arrangements are not placed about the centre line of the assembly of mirrors, but are displaced to the left and right hand sides (as viewed). The apertured screen 16 and photosensitive arrangement 14 for the left hand series of mirrors 1 to 10 is displaced at the right hand side of the assembly of mirrors, whilst the apertured screen 17 and photo-sensitive arrangement 18 for the right hand series of mirrors 1a to 10a is displaced on the left hand side (as viewed) of the system of mirrors.

The arrangement of mirrors in FIG. 2 also differs from that of the mirrors in FIG. 1 by being arranged on a curve such that for each mirror the relationship between the image distance between each individual element and the aperture associated therewith on the one hand and the projected slit width at the mirror on the other hand is substantially the same for each mirror.

In the case of the arrangement shown in FIG. 2 in a practical case the radius of curvature of each of the mirrors was as follows:

| Mirror | Radius |
|---|---|
| 1 and 1a | —22.36" |
| 2 and 2a | —24.06" |
| 3 and 3a | —25.77" |
| 4 and 4a | —27.51" |
| 5 and 5a | —29.34" |
| 6 and 6a | —31.24" |
| 7 and 7a | —33.26" |
| 8 and 8a | —35.46" |
| 9 and 9a | —37.96" |
| 10 and 10a | —40.82" |

Both apertures in the screens 17 and 16 lie in planes making an angle of 27°.36' with the planes of incident light. The individual mirrors are spaced by 0.8", whilst the object distance to the slit plane is 200". The slit width is 0.037" giving an effective slit width at the object of 0.4".

Reference will now be made to FIGS. 3 and 4 which illustrate the considerations in positioning each of the individual mirrors in the arrangement or FIG. 2.

Referring to FIGS. 3 and 4, the mean object plane, i.e. the line of travel in space of a moving object is shown in FIG. 3 at 19. Mn is any one of the mirrors 1 to 10 or 1a to 10a of FIG. 2, whilst the slit aperture with which the mirror is associated is represented at 15'. The slit plane and the plane passing through the center of the slit and parallel to the incident light are represented respectively at 20 and 21. The plane of incident light is represented at 22. Uo is the distance from the mean object plane 19 to a line 23 perpendicular to the plane 21. Un is the distance between the mean object plane 19 and the mirror Mn. dn is the distance between the plane 22 and the plane 21. $\theta n$ is the angle between the light path from the mean object plane 19 to the mirror Mn and the path of light from the mirror Mn to the slit in screen 16'. W is the actual width of the slit in screen 16', whilst w is the effective width of the slit in screen 16' as seen by the mirror.

From the geometry $$\text{Magnification } M = \frac{U_n}{v_n}$$

$$U_n = U_o + \frac{dn}{\tan \phi_n} = U_o + Ln$$

$$v_n = \frac{dn}{\sin \phi_n}$$

$$\text{Hence } M = \frac{U_o \sin \phi_n + dn \cos \phi_n}{\sin \phi_n} \times \frac{\sin \phi_n}{dn}$$

$$= \frac{U_o \sin \phi_n + dn \cos \phi_n}{dn}$$

Apparent width of slit (image width) at slit $$= w = W\sin(90° - \alpha + \theta n) = W\cos(\alpha - \theta n) \text{ where W = slit width}$$

Hence width of image in object plane = MW = D $$D = \frac{U_o \sin \theta_n + dn\cos\theta_n}{dn} W\cos(\alpha - \theta_n)$$

$$\text{or } \frac{Ddn}{W} = (U_o \sin \theta_n + dn\cos \theta_n)\cos(\alpha - \theta_n) .$$

Where D is the width of the projected grating line in space.

The arrangement shown in FIG. 2 is preferred in most cases since the magnification of the image at the slit is similar for each mirror.

Again each photo-sensitive arrangement may comprise two photo-electric detectors mounted side by side to view adjacent portions of each grating line in space, the outputs of the two detectors being relatively inverted and combined in such manner that spurious responses tend to cancel.

I claim:

1. An apparatus for optically measuring the velocity along a particular line of travel of a moving object and providing therefrom an electrical output which includes a spectral component of modulation dependent upon said velocity in which there is provided a set of elemental reflecting elements each arranged to view a different spaced portion of said line of travel to provide an effective optical grating in space along said line and a common photo-sensitive device arranged to receive light from each of said reflecting elements via an aperture common to all of the elements in said set and to provide therefrom said electrical output.

2. An apparatus as claimed in claim 1 and wherein said individual reflecting elements are each part cylindrical mirrors, the whole arrangement being such that for each reflective element $$w = \frac{v}{u} \times s$$

where $w$ is the width of said aperture as seen by the element $u$ is the object distance from said element to its respective portion of said line of travel and chosen arbitrarily with a mean range in view $v$ is the image distance of said reflective element and $s$ is the spatial frequency of said grating in space.

3. An apparatus as claimed in claim 1 and wherein at least some of the individual reflective elements are aligned on a common plane perpendicular to the planes of incident light on the elements.

4. An aparatus as claimed in claim 1 and wherein each element is inclined at an angle which is greater than that of one adjacent element while less than that of anothher adjacent element and wherein some of said elements depart from a common plane perpendicular to the planes of incident light on said elements to an increasing extent so as to provide optimum reflective light to said photo-sensitive device.

5. An apparatus as claimed in claim 1 and wherein two sets of reflective elements are provided each forming one half portion of a dish and each directing light to a common photo-sensitive device individual to that set.

6. Apparatus for measuring relative velocity between the apparatus and an object along a line in a plane containing the object and remote from the apparatus, comprising in combination:

photosensitive means for producing an electrical output signal in response to fluctuations in intensity of light incident thereon;

reflective means for focussing light toward said photosensitive means and comprising a number of discrete concave reflective surface portions oriented to view successive segments along said line; and means defining an aperture adjacent said photosensitive means and between said photosensitive means and said reflective means for cooperating with said reflective means to produce an effective optical grating along said line in said plane whereby said electrical output signal is dependent upon relative movement between said effective optical grating and an object.

7. Apparatus as defined in claim 6 wherein said reflective means comprises a set of part cylindrical reflective surfaces.

* * * * *